United States Patent

[11] 3,619,705

[72] Inventor George Cleveland Waybright
Batavia, N.Y.

[21] Appl. No. 865,774
[22] Filed Oct. 13, 1969
[45] Patented Nov. 9, 1971
[73] Assignee GTE Sylvania Incorporated

[54] AUTOMATIC BEAM CURRENT LIMITER CIRCUITRY
8 Claims, 1 Drawing Fig.

[52] U.S. Cl. .......... 315/22, 315/30
[51] Int. Cl. .......... H01j 29/70
[50] Field of Search .......... 315/22, 30; 323/4, 31, 42, 9

[56] References Cited

UNITED STATES PATENTS

| | | | |
|---|---|---|---|
| 3,440,481 | 4/1969 | Rhee et al. .......... | 315/22 |
| 3,462,643 | 8/1969 | Turner et al. .......... | 323/9 X |

*Primary Examiner*—Rodney D. Bennett, Jr.
*Assistant Examiner*—H. A. Birmiel
*Attorneys*—Norman J. O'Malley, Donald R. Castle, Thomas H. Buffton and Edward J. Coleman ABSTRACT: In a television receiver in which a video amplifier is DC coupled as a signal source to the one or more cathodes of a picture tube and the high-voltage power supply for the picture tube includes a voltage tripler coupled between the retrace pulse output of a high-voltage circuit and the second anode of the picture tube, a circuit for automatically limiting picture tube beam current comprising a resistor connected between the tripler reference terminal and ground, and a rectifier and Zener diode connected between that resistor and a bias circuit for the video amplifier. The resistor develops voltage pulses from the tripler which when rectified provide a control voltage which is a function of picture tube beam current. Application of this control voltage to the bias circuit via the Zener diode, which functions as a threshold device, provides a degenerative feedback signal operative to limit beam current and thereby provide overload protection for the picture tube.

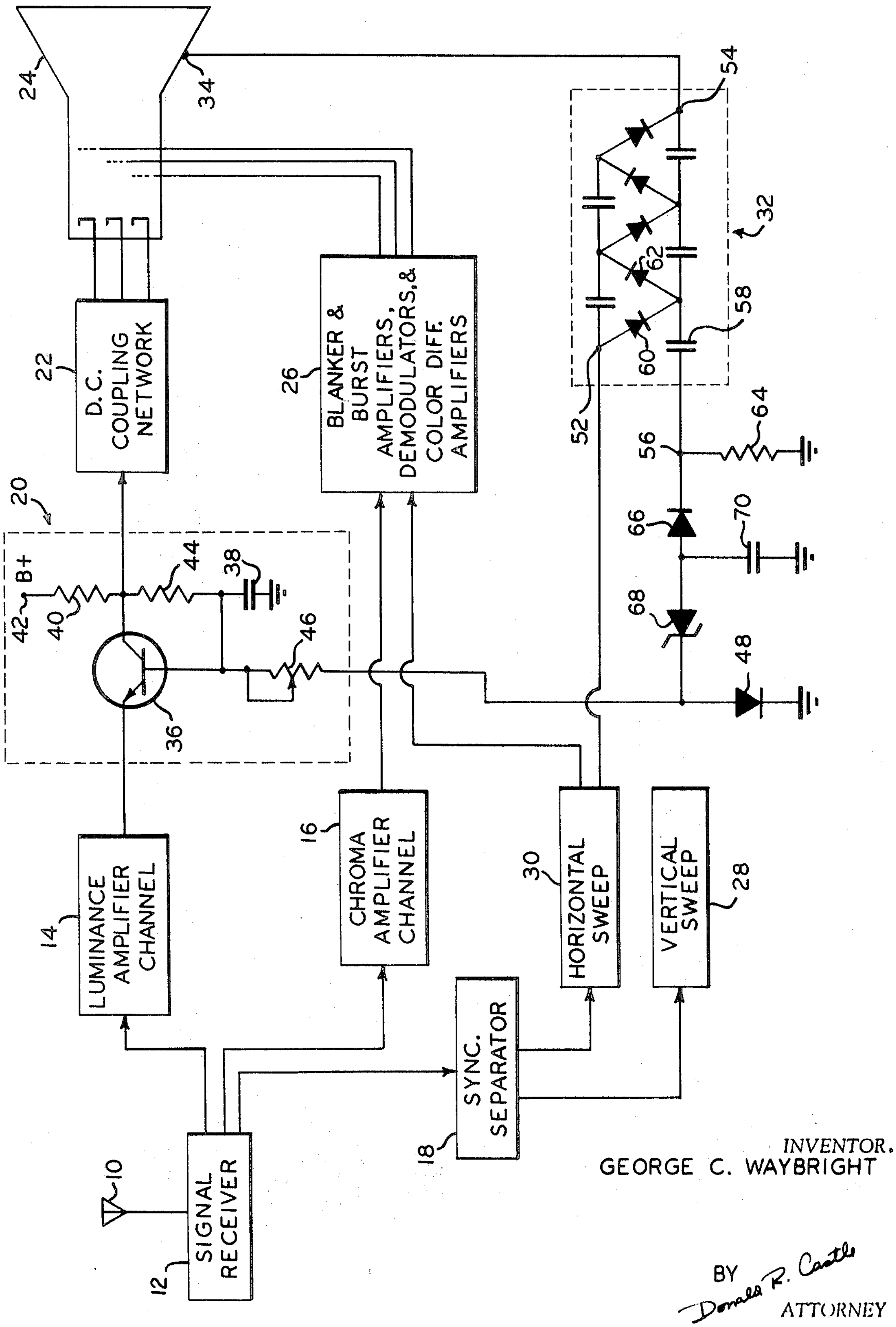
INVENTOR.
GEORGE C. WAYBRIGHT
BY Donald R. Castle
ATTORNEY

AUTOMATIC BEAM CURRENT LIMITER CIRCUITRY

BACKGROUND OF THE INVENTION

This invention relates to control circuits for electronic apparatus and, more particularly, to load current limiter circuits.

An especially useful application of the present invention is the provision of picture tube beam current limiting in a color television receiver, wherein such overload protection is particularly required due to the relatively high beam current levels encountered. Although equally applicable to black and white receivers, the relatively lower beam current levels of such receivers lessens the practical necessity of employing limiting. Further, in receivers utilizing shunt regulation in the high voltage system, the visually observable defocusing effect produced by the loss of regulation with increased beam current tends to diminish the need for limiting. On series regulator systems, however, defocusing with higher current levels is not as noticeable, and as a consequence, the viewer may unknowingly permit undesirable overload beam current levels without reducing the brightness control.

One prior art approach for providing picture tube overload protection in a television receiver is to employ auxiliary brightness controls with compromise factory settings to restrict the range of the adjustable contrast and brightness controls. Although limiting beam current within proper bounds, the fixed nature of the preestablished range limit compromises precludes the continuous achievement of optimum picture quality.

In a prior art circuit for providing automatic picture tube beam current limiting, the isolated secondary winding of the high voltage transformer is returned to B+ through a brightness limiter potentiometer. The low side of this potentiometer is connected to the base of a video amplifier and through a fixed bias brightness limiter transistor to ground. The brightness limiter transistor is connected as a Zener diode to regulate and keep constant the base bias of the video amplifier. More specifically, the brightness limiter potentiometer is adjusted to provide an operating range (within a desired maximum beam current limit) over which the brightness limiter transistor will be conducting to share the current flow through the potentiometer with the picture tube. In this conducting state, the brightness limiter transistor provides a constant base bias voltage for the video amplifier. Upon exceedance of the maximum beam current limit, however, all of the potentiometer current flows through the picture tube, thereby causing the limiter transistor to become nonconducting and thus stop its bias regulating action. Hence, as picture tube current increases, the forward bias of the video amplifier is decreased, thus decreasing brightness and reducing picture tube beam current. Accordingly, overload protection is provided for the picture tube, and due to the automatic monitoring and limiting of beam current, this system is adaptable to varying signal modulation characteristics to provide a much wider range of optimum picture quality than a receiver employing auxiliary brightness controls with fixed settings.

It will be noted, however, that the above-described system employs an isolated transformer winding for beam current sensing. This imposes a significant disadvantage, as the isolation of a high voltage transformer winding in a tube deflection system is quite expensive and inconvenient. Further, isolation of the transformer winding is particularly difficult when employing a voltage multiplier in the high voltage system. Use of such multipliers is particularly desirable as they automatically provide a focus control signal, reduce radiation and eliminate the need for a high voltage rectifier, and provide improved regulation.

SUMMARY OF THE INVENTION

With an awareness of the aforementioned disadvantages of the prior art, it is an object of the present invention to provide an improved control circuit for electrical apparatus.

It is another object of the invention to provide an improved automatic beam current limiter circuit for a television receiver.

Briefly, these and other objects are achieved in one aspect of the invention and in combination with a multiplier power supply by means comprising an impedance connected between a reference terminal of the multiplier power supply and a source of reference potential, and means for coupling the voltage developed across the impedance to a utilization means. In another aspect of the invention, a rectifier and potential threshold means are coupled between the impedance and the utilization means.

BRIEF DESCRIPTION OF THE DRAWING

This invention will be more fully described hereinafter in conjunction with the accompanying drawing illustrating a color television receiver employing a particular embodiment of the invention.

DESCRIPTION OF THE PREFERRED EMBODIMENT

For a better understanding of the present invention, together with other and further objects, advantages and capabilities thereof, reference is made to the following disclosure and appended claims in connection with the above-described drawing.

Referring to the drawing, there appears in block form the well known and conventional elements of a color television receiver. These block elements are depicted only for the purpose of more clearly illustrating a particular embodiment of the present invention, which is illustrated schematically. The color television receiver shown comprises an antenna 10 for intercepting transmitted television signals and coupling these intercepted signals to a signal receiver 12 including a tuner, an intermediate frequency channel, a sound channel, and a video detector. The detected video signal output of receiver 12 is coupled to a luminance amplifier channel 14, a chroma amplifier channel 16, and a sync separator circuit 18. The last stage of the luminance channel, namely video output amplifier 20, is shown schematically at the output of block 14 to more clearly illustrate how it is bias controlled by the automatic limiting circuitry. The video signals available from amplifier stage 20 are direct current (DC) coupled via network 22 to the cathode electrodes of a tricolor cathode ray tube display device 24, more commonly referred to as a picture tube.

The chroma information from channel 16 is coupled to appropriate demodulators in block 26. Circuit block 26 also includes a set of color difference amplifiers coupled to the outputs of the demodulators, a burst amplifier employed in the conventional manner, and a blanker amplifier for controlling the chroma output, color difference and burst amplifiers in the usual manner. The color difference amplifier outputs of block 26 are then applied to grid electrodes of picture 24.

Circuit block 18 separates the synchronizing pulses from the video signals and applies these pulses to control the vertical and horizontal sweep circuitry, 28 and 30 respectively. In turn, the vertical and horizontal sweep circuits develop potentials suitable for application to electron beam deflection apparatus (not shown) associated with picture tube 24. The horizontal sweep circuit 30 also provides an output for driving the blanking amplifier in block 26 and has another output coupled through a high voltage tripler circuit 32 to the second anode 34 of picture tube 24. Typically, these outputs and the horizontal deflection potentials are obtained from the tapped primary of a flyback transformer in the horizontal sweep circuit. The circuit 30 output coupled to the tripler functions as a pulsed power supply for the receiver high voltage system by providing an output of horizontal retrace pulses, which are rectified and voltage multiplied by the tripler 32 prior to application to second anode 34.

Returning to the luminance channel, video output stage 20 is a conventional common base amplifier comprising a transistor 36 having a base electrode coupled to ground via bypass capacitor 38, a collector electrode connected to the DC coupling network 22, and an emitter electrode connected to the video signal output of luminance amplifier block 14. The collector supply is provided via resistor 40 from a source of DC voltage typically +20 volts and represented by terminal 42. The base bias is established by a voltage divider comprising a resistor 44, which is connected between the base and collector of transistor 36, a brightness control potentiometer 46, and in this particular embodiment a normally conducting diode 48 connected between the base electrode of the video amplifier and a source of reference potential, illustrated as ground.

High voltage tripler 32 has an input terminal 52 coupled to the output of sweep circuit 30 providing horizontal retrace pulses, an output terminal 54 coupled to second anode 34 of the display device, and a reference terminal 56 adapted to be coupled to ground. The illustrated tripler circuit is of the conventional type employing two parallel strings of capacitors with crisscross connected diodes arranged to charge and discharge respective capacitors in response to applied input pulses. Of particular interest with respect to the invention, the tripler includes a capacitor 58 having one terminal connected to reference terminal 56 and the opposite terminal coupled through a plurality of series capacitors to output terminal 54. The tripler further includes a diode 60 connected between input terminal 52 and the output side terminal of capacitor 58 for charging the capacitor, and a diode 62 connected between the output side terminal of capacitor 58 and the output side terminal of a capacitor coupled to input terminal 52 for discharging capacitor 58.

As terminal 56 comprises the ground return of tripler 32, it is normally connected directly to ground. In accordance with one aspect of the present invention, however, a voltage drop resistor 64 is connected between the tripler reference terminal 56 and ground, whereby resistor 64 is in series with capacitor 58. The voltage developed across resistor 64 in response to pulse driven tripler action is then coupled to the bias circuit of video amplifier 20 through a rectifier 66 and zener diode 68. The rectifier comprises a diode 66 having an input cathode terminal, which is connected to the junction of resistor 64 and terminal 56, and an output anode terminal coupled through Zener diode 68 to the junction of brightness control 46 and diode 48. The rectifier further includes a filter capacitor 70 connected between the anode of diode 66 and ground.

In operation, the retrace pulse output of sweep circuit 30 functions as a power supply to drive multiplier 32 and thus provide a high voltage output to a load comprising picture tube 24. The load current flowing through this high voltage system is the electron beam current of picture tube 24 controlled by the relative voltages of its cathode and grid electrodes. Hence, one of the receiver circuits operative to control the picture tube beam current is video amplifier 20, the output of which is DC coupled to the picture tube cathodes. Accordingly, brightness control 46 may be used to vary beam current, as adjustment of this control varies the base bias of transistor 36, which in turn controls the collector output voltage DC coupled to the picture tube cathodes.

Returning to the action of the tripler circuit, each application of a retrace pulse to input terminal 52 causes capacitor 58 to charge through diode 60, while the period between pulses permits discharging of that capacitor through diode 62. This charging and discharging of capacitor 58 produces a bipolar pulse voltage waveform across resistor 64 which has an amplitude directly proportional to the current drawn from the tripler over the normal operating range. Hence, the insertion of resistor 64 in the ground return of the tripler provides means for deriving a signal which is proportional to picture tube beam current. Of course, this function may also be provided by substituting any other suitable voltage dropping impedance for resistor 64.

The bipolar pulse waveform developed across resistor 64 may now be converted to a positive or negative DC feedback voltage by use of an appropriate half-wave rectifier. In the drawing, rectifier diode 66 is oriented to provide a negative DC voltage signal, which is filtered by capacitor 70. If this negative voltage does not exceed the breakdown point of zener diode 68, it will be blocked, or isolated, from the video amplifier bias circuit. Under these normal conditions, diode 48 is forward biased to conduction by the positive voltage coupled from the collector of transistor 36 via resistor 44 and potentiometer 46.

If the negative feedback voltage at the output of rectifier diode 66 exceeds the zener diode breakdown point, however, Zener diode 68 will couple the negative feedback voltage to the video amplifier bias circuit. Upon breakdown and conduction of the Zener diode, diode 48 is reverse biased to provide an open circuit between its anode and ground and thereby permit the negative feedback voltage to flow through the brightness control circuit in the base of video amplifier transistor 36. This negative feedback decreases the forward bias of transistor 36 and thus increases its collector voltage. As a result the potentials on the picture tube cathodes are increased and beam current is reduced. Accordingly, the circuit comprising resistor 64, diode 66, capacitor 70, Zener diode 68 and diode 48 provides automatic means for deriving a control signal which is a function of picture tube beam current and applying that control signal as a degenerative feedback signal to vary the bias of a signal source controlling picture tube beam current.

Zener diode 68 functions as a potential threshold means to delay the application of the degenerative feedback control signal until the beam current exceeds a predetermined maximum limit, or bound, which yields a control voltage sufficiently negative to cause breakdown of the Zener diode. Hence the control circuit design and Zener diode selection determines the desired beam current limit. This delay or threshold feature permits optimizing the contrast and brightness control ranges for best picture quality and preserving DC coupling between the video amplifier and the picture tube up to the predetermined threshold beam current level. Accordingly, picture tube beam current is automatically limited within a predetermined bound to provide overload protection for the picture tube. Further, as the control circuit uses the tripler ground return for current sensing, isolated flyback windings are not required, thereby permitting more universal application.

In an implementation of the invention employing a 5.5 volt Zener diode, beam current was reduced approximately 5 percent at 1 milliamp, and from 2 milliamps it was reduced to 1.3 milliamps. A typical maximum beam current rating for color picture tubes is 1 milliamp. In practice under maximum conditions, a beam current of 1.6 milliamps is considered safe.

It is to be understood that the invention is not limited to use in television receivers having cathode ray tube display devices, but may be employed in other types of electrical apparatus having an alternating current AC or pulsed power supply, voltage multiplier, and load. For beam current limiting in a color receiver, the control signal may be applied to the bias circuits of any luminance amplifier or any of the chroma amplifiers. Of course, the circuit is equally applicable to monochrome television receivers. As for control circuit structure, some applications may require coupling of the bipolar pulse output of resistor 64 as the control signal to a utilization means. Rectification may be provided by a transistor pulse amplifier. A DC amplifier may be coupled at the output of the rectifier. Threshold devices other than a zener diode may be employed.

Hence, although the invention has been described with respect to certain specific embodiments, it will be appreciated that modifications and changes may be made by those skilled in the art without departing from the true spirit and scope of the invention.

I claim:

1. In a television receiver including an AC or pulsed power supply, an electron beam display device having a plurality of electrodes, a signal source coupled to at least a first one of said electrodes, and a voltage multiplier coupled between said power supply and a second one of said electrodes and having a reference terminal adapted to be coupled to a source of reference potential, control means for deriving a control signal which is a function of a beam current in said display device comprising an impedance connected between the reference terminal of said multiplier and said source of reference potential, utilization means operative to control the beam current of said display device, means connected to said impedance for developing a control voltage proportional to the beam current of said display device, and means including a potential threshold means for coupling said means for developing a control voltage to said utilization means for application of said control voltage via said potential threshold means to said utilization means as a degenerative feedback signal to limit said beam current to thereby provide overload protection.

2. The control means of claim 1 wherein said means for developing a control voltage further includes a rectifier having input and output terminals, the input terminal of said rectifier being connected to the junction of said impedance and said reference terminal, said control voltage is a DC voltage available at the output terminal of said rectifier, and said potential threshold means is coupled between the output terminal of said rectifier and said utilization means.

3. The control means of claim 1 wherein said potential threshold means comprises a Zener diode, and said impedance is a resistor.

4. The control means of claim 1 wherein said television receiver includes a horizontal sweep circuit having an output providing horizontal retrace pulses, said power supply comprises the retrace pulse output of said sweep circuit, and said multiplier has an input terminal coupled to the output of said sweep circuit providing horizontal retrace pulses, an output terminal coupled to said display device, and said reference terminal connected to said impedance, said multiplier including a capacitor having a first terminal connected to said multiplier reference terminal and a second terminal coupled through circuit means to said multiplier output terminal, a first diode connected between said multiplier input terminal and the second terminal of said capacitor for charging said capacitor, and a second diode connected between the second terminal of said capacitor and circuit means coupled to said multiplier input terminal for discharging said capacitor.

5. The control means of claim 2 wherein said utilization means is included in the signal source coupled to said display device and comprises a video amplifier having a bias circuit, and said potential threshold means is coupled between the output of said rectifier and said bias circuit.

6. The control means of claim 5 wherein said video amplifier bias circuit includes a brightness control potentiometer and a diode serially connected between an electrode of said video amplifier and said source of reference potential, and said potential threshold means is a Zener diode connected between the output of said rectifier and the junction of said diode and said potentiometer.

7. In electrical apparatus including an AC or pulsed power supply, an electron beam display device having a plurality of electrodes with a signal source being DC coupled to at least a first one of said electrodes, and a voltage multiplier coupled between said power supply and a second one of said electrodes, said multiplier having a reference terminal adapted to be coupled to a source of reference potential, means for deriving a control signal which is approximately proportional to the beam current of said display device and applying said control signal to a utilization means operative to control the beam current of said display device comprising, in combination: an impedance connected between the reference terminal of said multiplier and said source of reference potential, and means for coupling the voltage developed across said impedance to said utilization means, application of said control signal to said utilization means being operative as a degenerative feedback signal to limit said beam current and thereby provide overload protection.

8. The combination of claim 7 wherein said utilization means is included in the signal source coupled to said display device and comprises a video amplifier having a bias circuit, said control signal is a DC control voltage, and said means for coupling the impedance to the utilization means comprises a rectifier having input and output terminals, the input terminal of said rectifier being connected to the junction of said impedance and said reference terminal, said control voltage being available at the output terminal of said rectifier, and means coupling the output terminal of said rectifier to said bias circuit.

* * * * *